United States Patent [19]

Amoroso

[11] 4,025,320

[45] May 24, 1977

[54] DRY DUST COLLECTOR

[75] Inventor: Michael J. Amoroso, Marion, Ill.

[73] Assignee: M.A.T. Industries, Inc., West Frankfort, Ill.

[22] Filed: June 11, 1975

[21] Appl. No.: 585,971

[52] U.S. Cl. ............................ 55/1; 55/343; 55/347; 55/472; 209/144

[51] Int. Cl.² .................................. B01D 45/12

[58] Field of Search ............ 55/1, 97, 309, 338, 55/339, 345, 346, 348, 349, 472, 343, 344, 347, 340; 98/50; 209/144

[56] References Cited

UNITED STATES PATENTS

| | | | |
|---|---|---|---|
| 1,970,077 | 8/1934 | Collins | 55/343 |
| 2,357,734 | 9/1944 | Haber | 55/338 |
| 2,360,355 | 10/1944 | McBride et al. | 55/346 X |
| 2,405,624 | 8/1946 | Watson et al. | 55/343 |
| 2,515,894 | 7/1950 | Polk | 55/348 X |
| 2,799,355 | 7/1957 | Easton | 55/346 X |
| 2,806,551 | 9/1957 | Heinrich | 55/348 X |
| 2,963,109 | 12/1960 | Brookman et al. | 55/349 X |
| 3,049,343 | 8/1962 | Helming | 55/345 X |
| 3,289,567 | 12/1966 | Renner | 98/50 |
| 3,420,040 | 1/1969 | Neely et al. | 55/346 |

FOREIGN PATENTS OR APPLICATIONS

| | | | |
|---|---|---|---|
| 153,184 | 9/1953 | Australia | 55/348 |
| 511,510 | 8/1939 | United Kingdom | 55/345 |

Primary Examiner—Frank W. Lutter
Assistant Examiner—David L. Lacey
Attorney, Agent, or Firm—Cohn, Powell & Hind

[57] ABSTRACT

This dust collector provides a means of removing dust from air ventilation ducts without utilizing water and includes a cylindrical body aligned with the duct and having a bank of venturi tubes mounted between spaced walls within the body. An exhaust blower creates an airflow in the body and dust-laden air passing through the tubes is subjected to centrifugal action so that the dust is concentrated into a relatively small portion of the air, which is diverted transversely through the venturi throats and into a throat chamber defined by the spaced walls. An external conduit system communicating with the throat chamber returns the diverted air into the cylindrical body upstream of the exhaust blower through a return opening, the blower providing negative pressure in the conduit system which results in a portion of the air passing through the cylindrical body being continuously recycled. The conduit system houses a second bank of venturi tubes, which further concentrates the dust, and a bank of upright cyclone tubes, which receives and changes the direction of flow of the diverted air from the second bank of venturi tubes so that dust is deposited into a receptacle, for collection before the air is returned to the cylindrical body.

13 Claims, 7 Drawing Figures

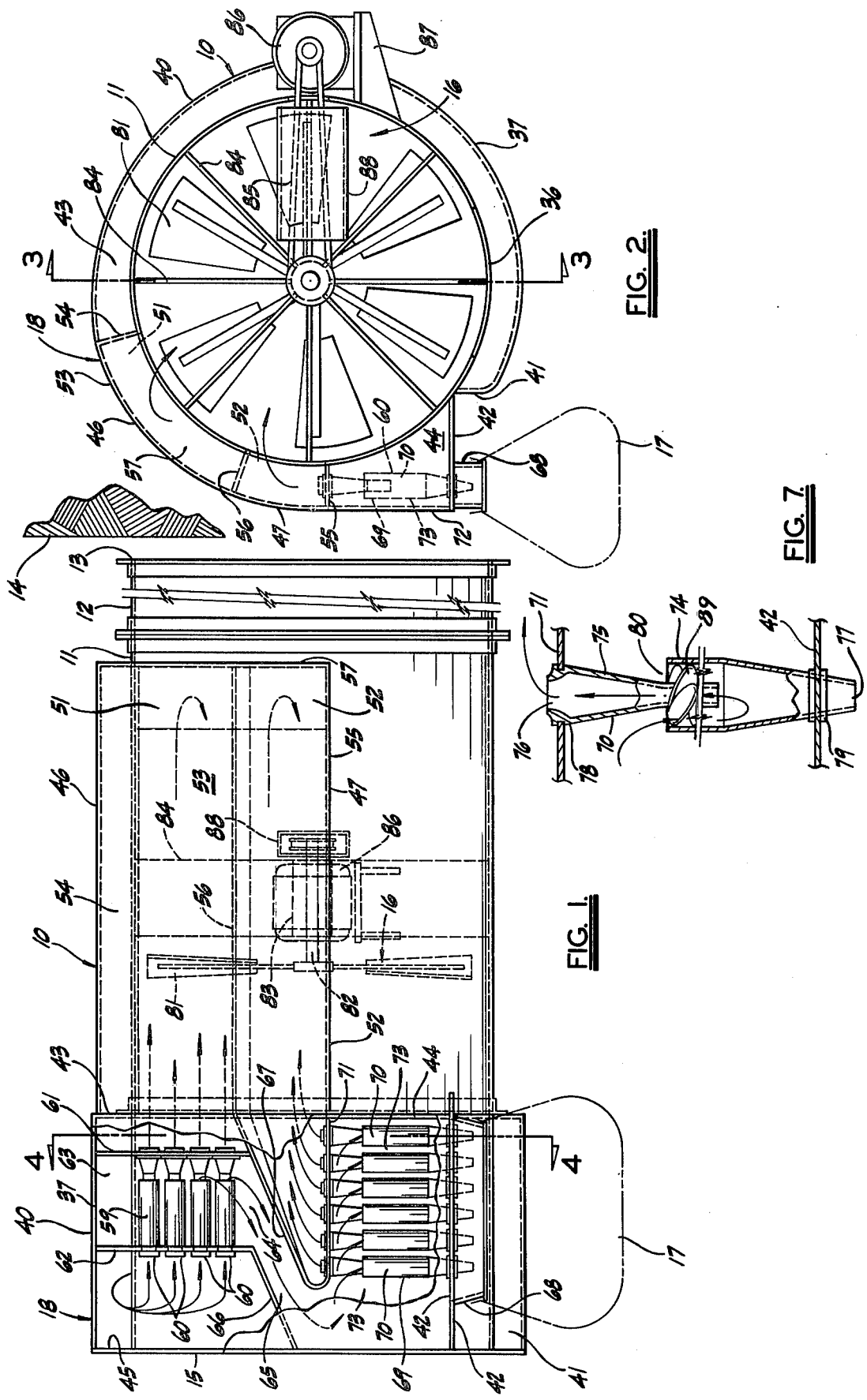

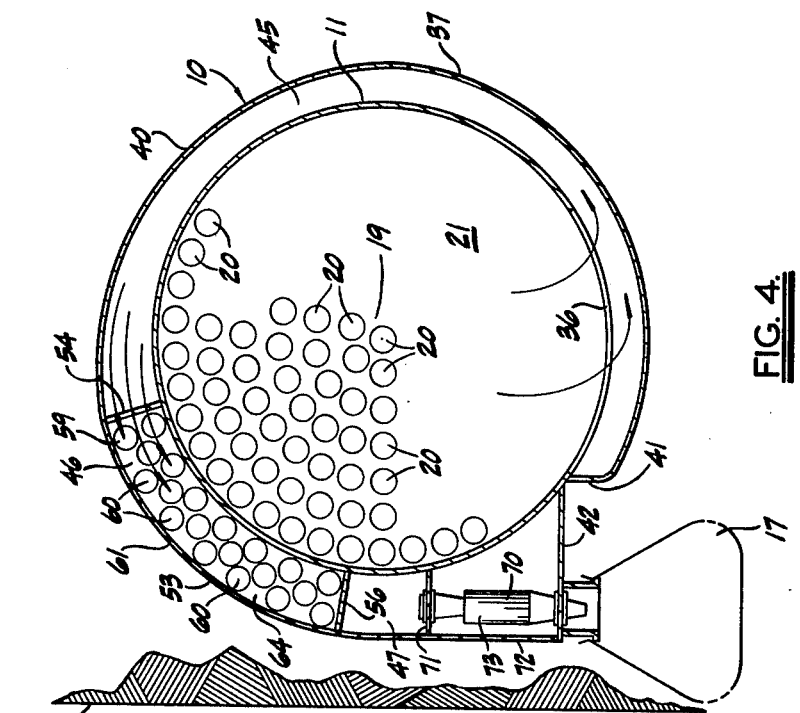
FIG. 4.
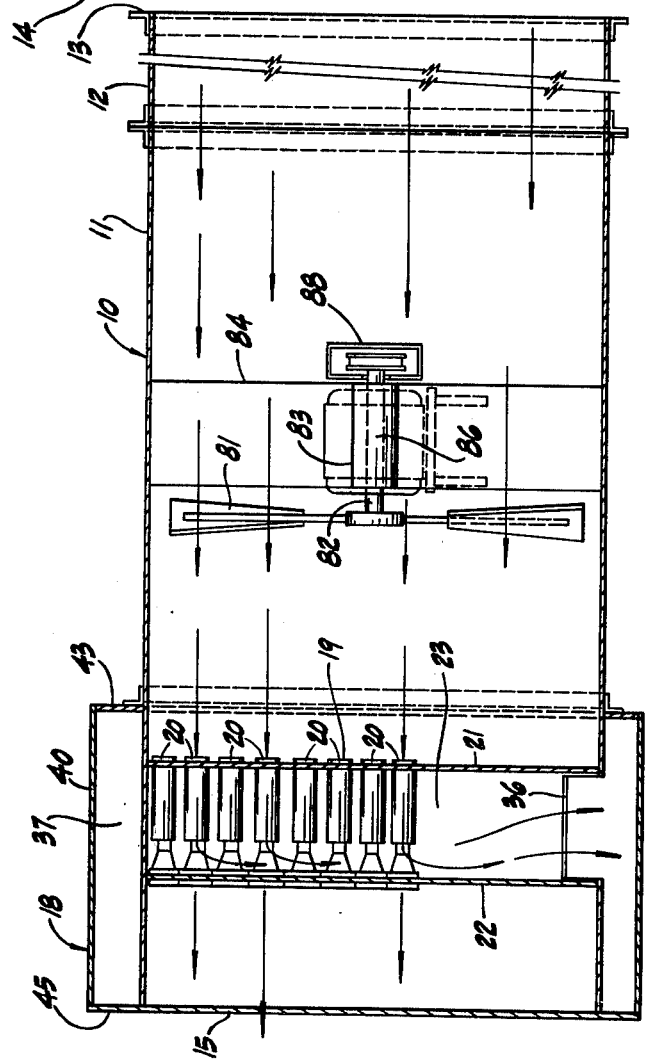
FIG. 3.
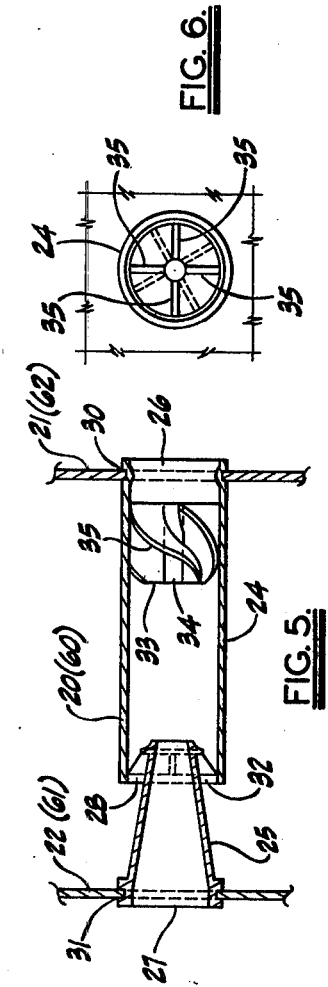
FIG. 6.
FIG. 5.

DRY DUST COLLECTOR

BACKGROUND OF THE INVENTION

This invention relates generally to a dust collector for removing air from a ventilation duct and in particular to a collector which will remove dust without the use of water sprays.

Underground coal mines must be ventilated to reduce methane concentrations to a safe level. One of the more successful ventilation methods has utilized an auxiliary exhaust blower located about 100 feet from the working face in a duct which extends to within about 10 feet of the mine face. The blower creates a negative pressure in the duct which withdraws air, methane, dust and the like from the vicinity of the mine face. As the air is routed out of the mine the dust settles and creates an explosion hazard. Rock dust must be added to the dust discharged from the ventilation duct to ensure that the incombustible content of the combined dust is reduced to a safe value. Rock dusting is not an ideal dust treating procedure and several dust collection methods have been developed in an effort to capture the combustible dust from the air as an alternative to rock dusting.

None of these alternative methods has proven satisfactory. For example, one such method employs a bank of screened venturis, within the air duct, and utilizes upstream water sprays to create water droplets, which mix with the air and dust and are wet-impinged on the surfaces of the venturi tubes. The dust particles mix with the water to form a slurry which is ejected by way of a scavenging duct. There are serious problems with this method resulting from excessive dust packing causing build-up on the screens, blockage of the scavenging duct and the plugging of the spray nozzles.

One known method of dry dust removal provides apparatus utilizing a duct stage which includes a plurality of helical turns of the duct itself within an accommodating dust collector hopper, the resulting centrifugal motion imparted to the air providing the dust separation means. Another method provides apparatus which diverts air from a main stream duct into concentrator and separator stages and utilizes an auxiliary blower to return air to the main stream. Neither apparatus utilizes successive banks of venturi units. Another method utilizes a single stage bank of cyclone tubes through which dust-laden air is drawn but does not envisage the diversion of a portion of the air carrying a concentration of the dust for treatment.

No apparatus in the known prior art reveals an apparatus providing a dry dust collection means having the features disclosed herein.

SUMMARY OF THE INVENTION

This dust collector apparatus provides a means of removing sufficient dust from a ventilating airstream so that it is unnecessary to utilize rock dust to eliminate explosion hazards.

The apparatus does not require the use of water sprays to allay the dust and thereby avoids many troublesome problems including the creation of a mud puddle in the vicinity of the auxiliary blower.

The apparatus utilizes successive venturi stages and can be made sufficiently compact for use in coal mines where space is limited. It is relatively uncomplicated in structure and is simple to manufacture and economical and efficient in operation.

It is a primary object of this invention to provide a duct means including inlet and outlet openings, an exhaust blower creating an airflow between said openings; a first bank of venturi tubes mounted downstream of the exhaust blower, a first throat chamber receiving air diverted from said first bank of tubes and return conduit means communicating with said throat chamber and returning said diverted air into the duct upstream of the blower, the blower producing a negative pressure in the conduit means.

It is an important object of this invention to provide a dust extraction means mounted within the conduit means to extract dust from at least a portion of said diverted air and dust receptacle means communicating with said extraction means to receive said extracted dust.

It is an object to provide a second bank of venturi tubes mounted within the conduit means and receiving air from the first throat chamber said tubes diverting a portion of said air into a second throat chamber.

Yet another object is to provide a dust extractor which includes a plurality of cyclone tubes disposed in a third throat chamber disposed downstream of the second throat chamber.

It is still another object of this invention to provide a first throat chamber, which includes spaced walls extending transversely of the longitudinal axes of said first bank of tubes; a second throat chamber, which includes spaced walls extending transversely of the longitudinal axes of the second bank of tubes and a conduit means, which includes circumferentially disposed first passage means communicating between said first and second throat chambers.

Another object is to provide second passage means communicating between the outlet orifices of the second bank of tubes and the return opening; third passage means communicating between said second throat chamber and the dust extraction cyclones and fourth passage means communicating between said cyclones and said return openings, said second and fourth passage means being disposed in side by side relation.

Another object of this invention is to provide the first and second banks of tubes with individual axes parallel with the longitudinal axes of the duct and the second bank of tubes being endwise reversed relative to the first bank of tubes and to provide second and fourth passage means which are in parallel relation with the duct.

It is an important object of this invention to provide a method of removing dust from an air ventilation duct by creating a primary airstream between upstream and downstream stations within the duct, and a return airstream between said stations; subjecting the airflow at the downstream station to venturi separator action to concentrate the dust and diverting a portion of the air containing said concentrated dust into the return airstream; subjecting the return airstream to venturi reverse flow action to extract dust therefrom, and collecting the dust.

It is another object to further concentrate the dust in the return airstream prior to the extraction thereof and to by-pass the remaining air into said duct.

BRIEF DESCRIPTION OF THE DRAWINGS

FIG. 1 is an elevational view of the dust collector with the conduit outer wall partly broken away to show the interior thereof;

FIG. 2 is an end view thereof;

FIG. 3 is a longitudinal cross-sectional view taken on line 3—3 of FIG. 2;

FIG. 4 is a transverse cross-sectional view taken on line 4—4 of FIG. 1;

FIG. 5 is an enlarged longitudinal cross-sectional view of an initial stage venturi tube;

FIG. 6 is an end view of the venturi tube of FIG. 5; and

FIG. 7 is an enlarged longitudinal cross-sectional view of a final stage venturi tube.

DESCRIPTION OF THE PREFERRED EMBODIMENT

Referring now to the drawings and first to FIGS. 1 and 2, it will be understood that the dust collector of the preferred embodiment is generally indicated by numeral 10 and includes a cylindrical body 11 which is connected to a ventilation duct 12 and, together with said duct, constitutes a duct means. The ventilation duct 12 includes an intake opening 13, disposed in the proximity of a mine face 14 and receiving dust-laden air, and the collector 10 includes discharge opening 15 discharging relatively clean air. An exhaust blower 16, mounted within the collector body 11 provides a means of creating an airflow between said intake and discharge openings 13 and 15.

Essentially, a portion of the air passing through the collector 10 is withdrawn from the collector body 11 at a location downstream of the exhaust blower 16. This air is subjected to successive cleaning stages in an external conduit system, which constitutes a conduit means and is generally indicated by numeral 18, and dust removed from the air is collected in a receptacle 17. The air is then returned to the cylindrical body 11 by the conduit system 18 at a location upstream of the exhaust blower 16. The disposition of the blower 16 between the air withdrawal and return locations provides a negative pressure within the conduit system 18 and ensures a continuous recycling of a portion of the air passing through the collector 10. The cleaning and collection process will now be described.

The initial air processing stage of the collector 10 is provided by a first bank of horizontally disposed venturi tubes, generally indicated by numeral 19. This first bank 19 is formed by mounting a plurality of individual tubes 20 between transversely disposed, longitudinally spaced walls 21 and 22, which are suitably apertured to carry the tubes 20 and cooperate with the cylindrical body 11 to define a first throat chamber 23. The tubes 20 constitute centrifugal separator tubes and are shown in detail in FIGS. 5 and 6. Each tube 20 includes a cylindrical body 24 and a coaxially related conical body 25 providing inlet and outlet orifices 26 and 27 respectively and defining a throat 28 therebetween. The bodies 24 and 25 are provided with mounting collars 30 and 31 which receive walls 21 and 22 respectively and the conical body 25 is provided with a plurality of circumferentially spaced fins 32 by which the coaxial relationship of the bodies is maintained. A twist inducing element 33 is mounted within the body 24 and said element is provided with a core 34 having a plurality of helical, integrally formed vanes 35 radiating therefrom. The vanes 35, four in number in the embodiment shown, twist through an angle of between 90° and 120° and provide a means of inducing spiral and centrifugal motion into the air passing longitudinally through said tubes 20.

The dust-laden air passing through the tubes 20 is subjected to centrifugal and venturi action with the result that the major portion of the air issues from the outlet orifice 27 in a substantially clean condition and a smaller portion, carrying centrifugally-separated, concentrated dust is diverted transversely and passes into the first throat chamber 23.

As shown in FIG. 4 particularly, the dust collector conduit system 18 includes an arcuate, circumferentially disposed conduit generally indicated by numeral 37 and constituting a first passage means. This conduit 37 communicates at one end with the throat chamber 23 by means of an opening 36 at the bottom of the cylindrical body 11. It is defined by an arcuate outer wall 40; end closure walls 41 and 42; upstream sidewall portions 43 and 44 and downstream sidewall 45; in cooperation with the cylindrical body 11. As best shown by FIGS. 1 and 5 the arcuate conduit 37 communicates indirectly with a pair of longitudinally extending return conduits 46 and 47 constituting second and fourth passage means respectively which also form part of the conduit system 18 and are disposed in side-by-side relation externally of the collector body 11 and provide re-entry into the body 11 by means of return openings 51 and 52 respectively, disposed upstream of the exhaust blower 16 in the cylindrical body 11. Return conduits 46 and 47 are defined by an outer wall 53, side walls 54 and 55, an intermediate wall 56 and an end wall 57 in cooperation with the cylindrical body 11, as shown in FIG. 1. However, before entering the return conduits 46 and 47 the air passing through the arcuate conduit 37 is further processed in an intermediate portion of the conduit system 18, as will now be described.

Conduit 37 communicates with return conduit 46 through a second bank of venturi tubes indicated by numeral 59. This second bank 59 is formed by mounting a plurality of individual tubes 60 between a pair of spaced arcuate walls 61 and 62 which are suitably apertured to carry said tubes 60. These spaced walls 61 and 62 are radially aligned with spaced plates 21 and 22 and, together with an end portion 63 of the return conduit sidewall 54 cooperate with the cylindrical body 11 to define a second throat chamber 64. The tubes 60 of the second bank 59, in the preferred embodiment, are identical to tubes 20 shown in FIGS. 5 and 6 but are endwise reversely oriented. Dust-laden air from conduit 37 passing through the tubes 60 is subjected to centrifugal and venturi action with the result that major portion of the air issues from the outlet orifices communicating with the return conduit 46, in a substantially clean condition from whence it passes into the cylindrical collector body 11 through return opening 51. The smaller portion of the air, carrying concentrated dust, is diverted into the second throat chamber 64 and passes into a connecting conduit 65, which constitutes a third passage means and is defined by inclined partition walls 66 and 67 in cooperation with the conduit outer arcuate wall 40 and the collector body 11, to pass through a third bank of venturi tubes indicated by numeral 69. This third bank 69 is formed by mounting a plurality of individual venturi tubes 70 between vertically spaced upper and lower walls. The upper wall is provided by an end portion 71 of the return conduit sidewall 47 and the lower wall is provided by the end closure wall 42 and said walls are suitably apertured to receive said tubes 70. Walls 71 and 42 cooperate with the end portion 72 of the arcuate outer plate 40, sidewall 44 and the collector body 11 to define a third throat chamber 73. The venturi tubes 70 which are of the cyclone type are shown in FIG. 7 in enlarged detail and constitute a dust extraction means. These tubes 70 are vertically oriented and include a lower, substantially cylindrical body portion 74 and an upper substantially conical portion 75 disposed in coaxial relation to each other. The upper and lower portions provide opposed orifices 76 and 77 respectively and are provided with collar portions 78 and 79 by which they are mounted to said spaced walls 71 and 42. The upper and lower portions of tubes 70 are spaced by conventional cyclone vanes 89 to define an intermediate throat 80 which receives the concentrated dust-laden air from conduit section 65 and induces cyclone, centrifugal flow therein. The centrifugal flow through the vaned throat causes separation of the dust and the reversal of flow to which the air is subjected on passing from the throat 80 to the upper orifice 76 causes the separated dust to fall under gravity through the lower orifice 77 and hence into the receptacle 17 which constitutes a dust receptacle means and is attached to a depending mouth-like projection 68 depending below the closure plate 42. Air passing through the upper orifice 76 is received into the return conduit 47 whence it passes into the collector body 11 through return opening 52.

The exhaust blower 16 which provides the necessary suction to draw air through the conduit system 18 includes a fan 81 which is mounted by means of a shaft 82 to a journal bearing 83 supported by radially extending plates 84 disposed within the collector body 11. The shaft 82 is belt driven by an inwardly extending belt 85 connected to a motor 86 mounted to an external bracket 87 and an inwardly projecting tube 88 is provided welded or otherwise attached to said collector body 11 and said radial plates 84 to protect said belt. The location of the fan 81 upstream of the firt throat chamber 23 and downstream of the return openings 51 and 52 creates the necessary negative pressure within the return conduits 46 and 47 to draw air through the successive banks of venturi tubes.

It is thought that the structural features and functional advantages of the dust collector have become fully apparent from the foregoing description of parts. However, for completeness of disclosure the operation of the collector will be briefly summarized with reference to a specific example.

When the exhaust blower 16 is actuated there is a continuous airstream flow from the duct intake opening 13 to the collector discharge opening 15. It will be assumed that the duct air flow is 9,000 cubic ft. per minute. Because the external conduit system 18 extends between two points located downstream and upstream of the blower 16, by virtue of throat chamber opening 36 and the return openings 51 and 52, there is a continuous, circulating flow of air through this conduit system. It will be assumed that under the flow capacities stated, about 10% of this flow is diverted through the tubes 20 of the first bank 19 and into the first throat chamber 23. This diverted air passes into the external, arcuate conduit 37 with the result that about 1000 cubic ft. per minute passes through the tubes 60 of the second bank 59 laden with concentrated dust. Most of this dust-laden air passes directly through the second bank 59, a relatively small portion being diverted by way of the second throat chamber 64 and connecting conduit 65 into the third throat chamber 73. Assuming again that about 10% of the air is diverted in this fashion then some 900 cubic ft. per minute passes into the return conduit 46 in a relatively clean condition and hence, via return opening 51 into the collector body 11, while 100 cubic ft. per minute having a further concentration of dust, passes into the tubes 70 of the third bank 69 by way of the throats 80. The reversal of the flow direction of the air passing through tubes 70 causes a deposit of the dust downwardly into the receptacle 17. This air passes into the second return conduit 47 in a substantially clean condition and, via return opening 52 into the duct. Thus, the total air return into the duct is 1,000 cubic ft. per minute which is additive to the airstream intake quantity. Thus, although the intake and discharge of air are at the rate of 9,000 cubic ft. per minute this quantity is augmented by 1,000 cubic ft. per minute continuously recycling so that 10,000 cubic ft. per minute is passing cyclically through the dust collector body between limits defined by the first throat chamber 23 and the return openings 51 and 52. The continuous recycling ensures a highly efficient rate of dust extraction.

I claim as my invention:
1. In an apparatus for removing dust in an air ventilation duct:
    a. duct means having a longitudinal axis and including an inlet opening, and an outlet opening longitudinally spaced therefrom,
    b. blower means in the duct means creating an airflow from said inlet opening to said outlet opening,
    c. a first bank of venturi tubes having centrifugal separator vane means and being mounted within said duct, each of said tubes having an inlet orifice, an outlet orifice and an open throat disposed therebetween, said tubes receiving air from said duct means and passing a portion of said air longitudinally therethrough and said vane means diverting a portion of said air transversely through said throats,
    d. a first throat chamber means connecting with said throats and receiving said diverted air from said first bank of tubes,
    e. conduit means connecting with said throat chamber means and including a return opening means connecting with said duct means,
    f. said blower means being located in said duct means to provide a relatively lower pressure at the return opening means than at the throat chamber means to circulate diverted air from said throat chamber means to the return opening means without the need for an auxiliary blower in the conduit means,
    g. dust extraction means mounted within said conduit means between said throat chamber means and said return opening means to extract dust from at least a portion of said diverted air, and
    h. dust receptacle means connecting with said dust extraction means to receive said extracted dust.
2. An apparatus as defined in claim 1, in which:
    i. said blower means is located in said duct means between said return opening means and said throat chamber means.
3. An apparatus as defined in claim 2, in which:
    i. a second bank of venturi tubes having centrifugal separator vane means is mounted within said conduit means each of said tubes having an inlet orifice, an outlet orifice and an open throat disposed therebetween, said tubes receiving air from said first throat chamber means, said tubes passing a portion of said air longitudinally therethrough and said vane means diverting a portion of said air transversely through said throats, k. a second throat chamber means connecting with said throats of said second bank of venturi tubes is disposed within said conduit means to receive said diverted air from said second bank of tubes, and l. the conduit means includes:
1. first passage means connecting said first throat chamber means and the inlet orifices of said second bank of tubes,
2. second passage means connecting said outlet orifices of said second bank of tubes and said return opening means,
3. third passage means connecting said second throat chamber means and said dust extractor means, and
4. fourth passage means connecting said dust extractor means and said return opening means.

4. In an apparatus for removing dust in an air ventilation duct:
a. duct means having a longitudinal axis and including an inlet opening and an outlet opening longitudinally spaced therefrom,
b. blower means in the duct means creating an airflow from said inlet opening to said outlet opening,
c. a first bank of centrifugal separator tubes having centrifugal separator vane means mounted within said duct means having axes parallel with the longitudinal axis of the duct means, each of said tubes having an inlet orifice, an outlet orifice and an open throat disposed therebetween, said tubes receiving air from said duct means and passing a portion of said air longitudinally therethrough and diverting a portion of said air transversely through said throats,
d. a first throat chamber means connecting with said throats and receiving said diverted air from said first bank of tubes,
e. conduit means connecting with said first throat chamber means and including a return opening means connecting with said duct means,
f. a second bank of centrifugal separator tubes having centrifugal separator vanes means mounted within said conduit means between said first throat chamber means and said return opening means, each of said tubes having an inlet orifice, an outlet orifice and an open throat disposed therebetween, said tubes receiving air from said first throat chamber means and said tubes passing a portion of said air longitudinally therethrough and diverting a portion of said air transversely through said throats,
g. a second throat chamber means connecting with said throats of said second bank of centrifugal separator tubes and receiving said diverted air from said second bank of tubes,
h. dust extraction means mounted within the conduit means between said second throat chamber means and said return opening means to extract dust from at least a portion of said diverted air, and
i. dust receptacle means connecting with said dust extraction means to receive said extracted dust.

5. An apparatus as defined in claim 4, in which:
j. the first throat chamber means includes spaced walls extending transversely of the longitudinal axes of said first bank of tubes,
k. the second throat chamber means includes spaced walls extending transversely of the longitudinal axes of said second bank of tubes,
l. the conduit means includes:
1. first passage means connecting said first throat chamber means and said inlet orifices of said second bank of tubes,
2. second passage means connecting said outlet orifices of said second bank of tubes and said return opening means,
3. third passage means connecting said second throat chamber means and said dust extraction means, and
4. fourth passage means connecting said dust extraction means and said return opening means.

6. An apparatus as defined in claim 5, in which:
m. said duct means is substantially cylindrical, and
n. said first passage means includes an external conduit circumferentially disposed about said duct means.

7. An apparatus as defined in claim 5, in which:
m. said dust extraction means includes a third throat chamber means connecting with said third passage means and a plurlaity of venturi tubes having centrifugal separator vane means each of said tubes having opposed end orifices and an intermediate throat disposed therebetween, said tubes being mounted within said third throat chamber means to receive diverted air from said second throat chamber means into said intermediate throats said vane means separating dust from said diverted air, the orifices at one end connecting with said dust receptacle means to receive said separated dust and the orifices at the other end connecting with said fourth passage means and said return opening means.

8. An apparatus as defined in claim 5, in which:
m. the tubes of said first bank are mounted between said spaced walls of said first throat chamber means with their axes parallel to the longitudinal duct axis,
n. the tubes of said second bank are mounted between said spaced walls of said second throat chamber means with their axes parallel to the longitudinal duct axis but in endwise reversed relation to the tubes of said first bank.

9. An apparatus as defined in claim 5, in which:
m. said second and fourth passage means are disposed in substantially parallel relation with said longitudinal duct axis.

10. An apparatus as defined in claim 5, in which:
m. said return opening means is disposed between said duct inlet opening and said first throat chamber means.

11. An apparatus as defined in claim 4, in which:
j. the duct means is substantially cylindrical,
k. the first throat chamber means includes spaced walls extending transversely across said duct means and having the first bank of tubes mounted therebetween,
l. the second throat chamber means includes spaced walls disposed within said conduit means and having the second bank of tubes mounted therebetween, in relatively reversed relation to said first bank of tubes,
m. said dust extraction means includes a third throat chamber means having spaced walls disposed within said conduit means and a bank of cyclone tubes mounted therebetween, each cyclone tube having centrifugal separator vane means and an upper orifice, a lower orifice connected with said dust receptacle means and an intermediate throat connected with said third throat chamber means, n. said return opening means is disposed between said duct inlet opening and said first throat chamber means, o. said blower means being disposed between said duct outlet opening and said return opening means, p. said conduit means includes:
  1. an external circumferential passage means connecting said first throat chamber means and the inlet orifices of said second bank of tubes,
  2. an external longitudinally extending passage means connecting said outlet orifices of said second bank of tubes and said return opening means,
  3. an external passage means connecting said second and third throat chamber means, and
  4. an external longitudinally extending passage means connecting said upper cyclone orifices and said return opening means.

12. A method of removing dust from an air ventilation duct comprising the steps of:

a. locating a primary pressure creating source within the duct to create a primary airstream internally of the duct between longitudinally spaced duct stations to provide a relatively high pressure station and a relatively low pressure station said airstream moving from said low pressure station to said high pressure station, b. connecting said high pressure station and said low pressure station externally of the duct to provide a secondary, return airstream moving from said high pressure station to said low pressure station said movement resulting from the location of said pressure creating source without the need for a secondary pressure creating source, c. separating the dust into a portion of the air at said high pressure station and diverting said portion into the return airstream by venturi separator action, d. extracting dust from said diverted airstream intermediate said high pressure and low pressure stations, e. collecting the extracted dust, and f. returning said diverted air into said duct at said low pressure station.

13. A dust removal method as defined in claim 12, in which:

g. the pressure creating source is located intermediate said duct stations.

* * * * *